May 15, 1956     L. LANCOUR     2,745,331
LAWN EDGERS
Filed Aug. 19, 1954
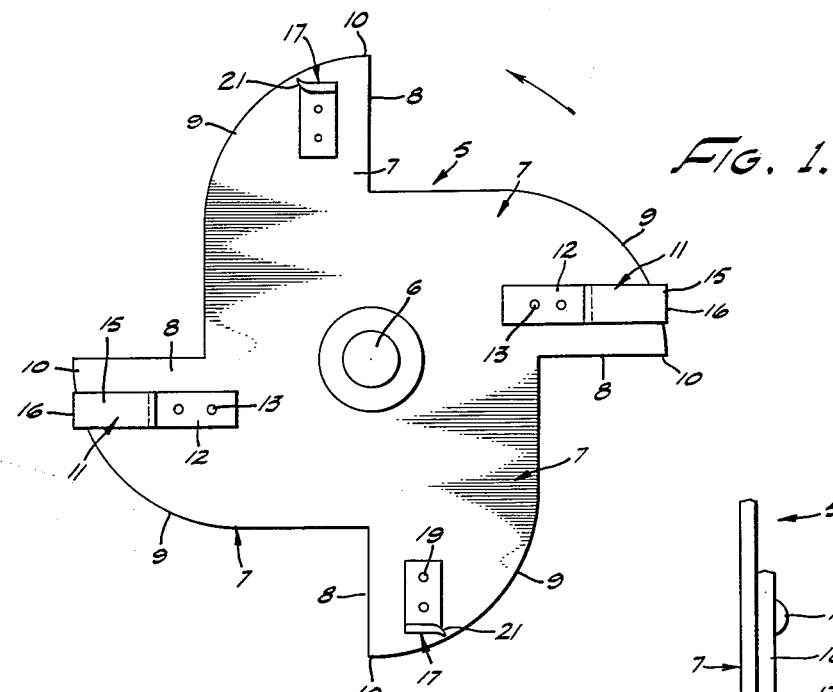
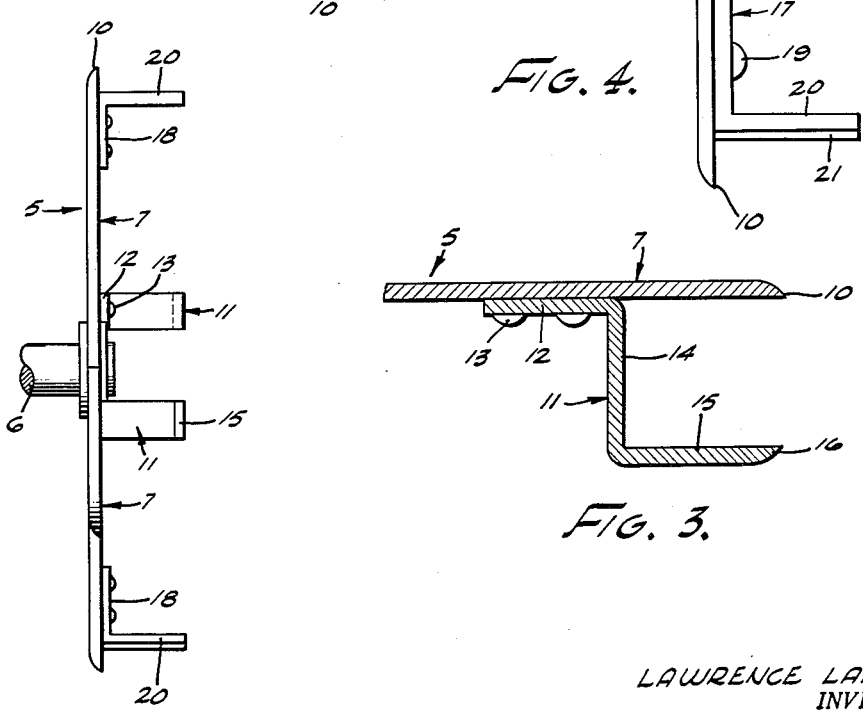
LAWRENCE LANCOUR
INVENTOR.
BY *Stedman B Hoar*
*Agent*
AGENT

United States Patent Office 2,745,331
Patented May 15, 1956

2,745,331

LAWN EDGERS

Lawrence Lancour, Santa Ana, Calif.

Application August 19, 1954, Serial No. 450,971

3 Claims. (Cl. 97—227)

This invention relates to lawn edgers, and particularly to a blade which may either be operated separately as an edger blade, or be attached at the side of a lawn-mower for the same purpose. In either case, I have found it desirable to have it driven by auxiliary power, either by a gasoline motor or an electric motor, as it operates best when rotated at a higher speed than is attainable from ground-engaging friction wheels even with a high gear ratio.

It is an object of my invention to provide a blade which will cut a sharp and distinct edge on a lawn, and which will dispose of the cut grasses and weeds in much the same way that a lawn-mower deposits cut grass in a hood or basket.

Another object of my invention is to provide a blade which makes two cuts or slices in the earth, slightly spaced apart and removes the grasses, weeds and cut earth from the trench between them, for example leaving a furrow between the edge of a lawn and a walk or driveway and not merely cutting off over-running grasses and weeds.

In the accompanying drawing illustrative of a presently preferred embodiment of my invention, Fig. 1 is an elevational side view of my improved lawn-edger blade;

Fig. 2 is an edge view of the same, from the left of Fig. 1;

Fig. 3 is an enlarged sectional view of one of the secondary blades; and

Fig. 4 is an enlarged view of one of the scoops by which the trench cut by the two blades is cleared of debris.

Having reference now to the details of the drawings, I have shown in Fig. 1 a lawn-edger blade 5 designed to revolve around a hub or shaft 6 in the direction indicated by the arrow. Any suitable means, either a ground-friction wheel and suitable gears, or a power motor, may be used to rotate the blade 5, but I prefer power. The blade 5 is composed of any even number of principal blades 7, four being illustrated as a suitable minimum, but six or eight may be used. Each principal blade has a side 8 radial to the hub and an arcuate cutting edge 9, the edge 9 of one blade intersecting the side 8 of the next preceding blade at about one-half the distance from the hub 6 to the blade tip 10. A saw-tooth arrangement is thus provided, in place of the conventional circular blade.

Of the principal blades 7, alternate blades carry secondary blades 11. As best shown in Fig. 3, each secondary blade 11 comprises a portion 12 by which it is attached to the respective blade 7 by rivets 13 or other suitable means, an offset portion 14 extending at a right angle to the principal blade 7, and a cutting portion 15, sharpened on the same side as the arcuate edge 9 and at the point 16. The offset 14 may be an inch or an inch-and-a-half in length, sufficient to space the cutting portion 15 laterally from the principal blade 7 so as to provide a double cut for the sides of a narrow channel. The cutting edge of the portion 15 extends outwardly so that the edge 16 is substantially aligned with the principal blade tip 10.

The intervening blades 7, between those carrying the secondary blades 11, carry scoops designed to clear out the cut made by the blades 7 and 11. Each scoop 17, as shown in Fig. 4 has a portion 18 secured to the respective blade 7 by rivets 19 or other suitable means and a scoop portion 20 extending at a right angle to the blade 7. The scoop portions 20 are of the same length outstanding from the blade 7 as the offset portions 14 of the secondary blades. The scoop portions 20 lie in planes chordal to the periphery of rotation of the blades 7, with their leading edges 21 substantially in alignment with the arcuate cutting edges 9.

From this point they extend chordally rearwardly, thus providing a scooping action. As they extend laterally the same distance as the secondary blades 11, their scooping action affects the full width of the channel cut by the blades 7 and 11. Their leading edges 21 are preferably bevelled to cut easily into the loosened earth.

My improved lawn-edger blade 5 is designed to rotate at high speed and to cut a narrow channel with the blades 7 and 11. When both sides of such a channel have been cut, the scoops 17 have no difficulty in removing earth, weeds, and other debris therefrom, leaving a neat edge on a lawn. When run along a concrete or brick driveway or walk, preferably with the principal blades 7 next thereto, a distinct dividing channel is left between the concrete and the lawn, preventing the growth of grass outwardly onto the concrete as occurs when the grass runners are merely chopped. A suitable basket may be rigged upon my lawn-edger to receive debris from the scoops 17.

Modifications of my invention will occur to those skilled in the art, and I desire to be protected to the full scope of the appended claims.

I claim:

1. A lawn-edger comprising a plurality of principal blades each having a smooth slicing edge inclined rearwardly from the direction of normal rotation and a tip pointed rearwardly from said edge, said blades being joined centrally in circular saw-tooth formation, secondary blades secured to some of said principal blades and spaced laterally from them, and scoops secured to others of said principal blades interspersed with said secondary blades and extending at right angles thereto for removing vegetation cut by said principal blades and said secondary blades.

2. A lawn edger comprising an even number of principal blades having arcuate cutting edges and joined centrally in circular saw-tooth formation, secondary blades secured to alternate ones of said principal blades and offset therefrom and extending parallel to said principal blades and having cutting edges in the same circumference as said cutting edges, and members extending at right angles to the others of said principal blades in planes chordal to the circle of rotation of said principal blades.

3. A lawn edger according to claim 2, in which the leading edges of said members are substantially in alignment with the arcuate edges of said principal blades within the circle of rotation of the tips of said principal blades, said members extending rearwardly from said leading edges, and laterally to positions in the plane of rotation of said secondary blades.

References Cited in the file of this patent

UNITED STATES PATENTS

| | | |
|---|---|---|
| 2,312,569 | Maga | Mar. 2, 1943 |
| 2,432,922 | Muzzy | Dec. 16, 1947 |
| 2,630,747 | Mintz | Mar. 10, 1953 |